United States Patent [19]

May et al.

[11] 3,815,125

[45] June 4, 1974

[54] PHOTOELECTRIC ENCODER ASSEMBLY

[75] Inventors: Paul L. May, North Little Rock; Richard J. Poe, Conway, both of Ark.

[73] Assignee: Baldwin Electronics Inc., Little Rock, Ark.

[22] Filed: Sept. 1, 1972

[21] Appl. No.: 285,596

[52] U.S. Cl....... 340/347 P, 74/DIG. 7, 235/92 GC, 235/92 MP, 250/237, 235/151.11
[51] Int. Cl................................................. G08c 9/00
[58] Field of Search..... 235/92 MP, 92 GC, 151.11; 250/237; 340/146.3 H, 347 P; 74/DIG. 2, DIG. 7, 240, 241; 318/567

[56] References Cited
UNITED STATES PATENTS

| | | | |
|---|---|---|---|
| 3,210,550 | 10/1965 | Benton | 250/237 R |
| 3,297,879 | 1/1967 | Meyer | 340/146.3 H |
| 3,410,956 | 11/1968 | Grossimon et al. | 250/237 R |
| 3,546,671 | 12/1970 | Rogert et al. | 340/146.3 R |

*Primary Examiner*—Paul J. Henon
*Assistant Examiner*—Leo H. Boudreau
*Attorney, Agent, or Firm*—Hurvitz & Hyman

[57] ABSTRACT

A photoelectric encoder assembly including a housing, a U-shaped reader assembly positioned therein, and a scale located between the legs of the U. The reader assembly includes one leg supporting at least one light source and condensing lens on one side of the scale and another leg supporting at least one photocell on the other side of the scale. The scale is translatably secured to a moved element of a machine tool, and the reader is slidably and rotatably mounted on a rod extending parallel to the direction of motion of the moved element of the machine tool, such that relative motion of reader and scale occurs as the element moves, the reader being pivotable on the rod to automatically correct for inaccuracies of orientation of the scale in response to movements of a pair of adjustably positioned, low-friction bearing surfaces in the form of nylon screws threaded into the legs of the reader assembly and bearing on both sides of the scale, for precisely relatively positioning the photosensitive element and the scale for all translations of the scale by preventing changes of spacing between the scale and the lens and photo-cell reader for all relative locations of reader and scale.

8 Claims, 7 Drawing Figures

PATENTED JUN 4 1974 3,815,125

PHOTOELECTRIC ENCODER ASSEMBLY

BACKGROUND

The present invention relates to improvements in linear optical encoders which may be added to and utilized in conjunction with machine tools to measure movement of movable elements of the machine, such as platens or work tables. Such systems are old and well known. They commonly involve a scale marked with lines separated by known distances, say 1 mil, the lines being scanned or read out by photo-cell circuitry, which translates each line scanned to an electrical pulse, the pulses being counted. While the art involved has attained great sophistication, it has heretofore lacked a simple, low cost attachment for a machine tool which can be operatively bolted to the machine tool by a mechanic and will then operate accurately despite inevitable misalignments of the attachment with respect to the line of travel of the movable elements of the machine, and further which will maintain its own optical part spacing precisely and yet automatically even if the attachment is installed inaccurately.

In the prior art optical linear encoders have been instruments requiring precision installation if they were to operate accurately. The present system operates precisely when bolted to any machine tool and over the entire path of travel of the platen or work support of the machine tool, automatically making its own adjustments of optical paths from light beam source, to scale, to photo-cells, to maintain these optimum, for all positions of the platen and regardless of imprecision of installation of the attachment.

SUMMARY OF INVENTION

A digital system for measuring distance traveled by a translatable object with respect to a reference stationary object, wherein the translatable object carries a scale having digitally spaced markings thereon, the scale being rigidly secured to the translatable object but having a plane which normally is subject to inaccuracies of position, a readout for scanning the scale, the readout including a source of a light beam located on one side of the scale, the light beam being directed via the markings toward a photo-cell located on the other side of said scale, wherein the readout is rigidly secured to the stationary object only for translation therewith but is totally guided by the scale and is able to pivot so that a precise spatial relation is maintained between the scale and the photo-cell despite said inaccuracies of position of the plane of the scale.

DETAILED DESCRIPTION

Figure 1:
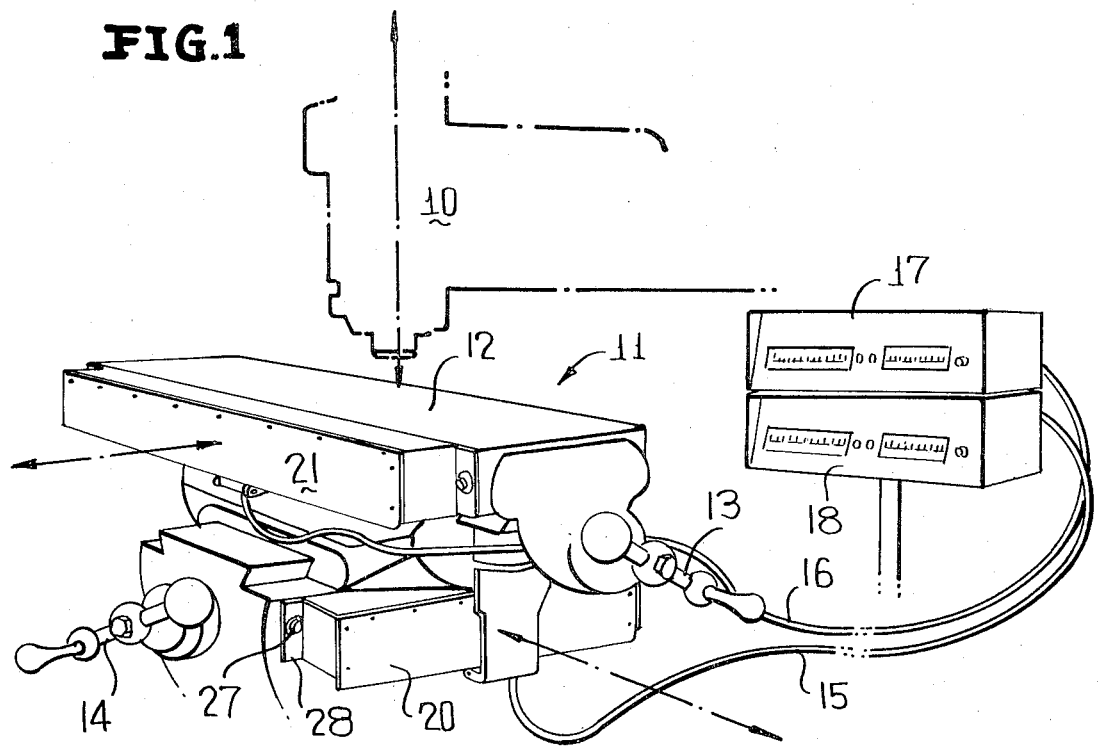
FIG. 1 is a view in perspective illustrating the linear encoder mounted on a machine tool and cabled to a readout.

Referring initially to FIG. 1 of the drawings, 10 represents a cutting tool holder of a conventional machine tool, such as a milling machine 11. The machine 11 includes a movable platen 12 to which a workpiece (not shown) may be secured. The platen 12 may be moved longitudinally or along a Y axis by turning crank 13. It may also be moved transversely, or along an X axis by turning crank 14. The machine tool is conventional and may be of a wide variety of types and sizes, the device of the present invention being applicable to any of these. Essentially the device incorporating the present invention, hereinafter called a linear encoder, measures movement of an object in a given direction by optically counting lines on a scale, as the scale moves relative to a stationary readout. Readout of a line produces an electrical pulse and the pulses are counted in a conventional counter to indicate how far the object has moved. Since machine tool 11 has movement in both the X and the Y directions, it requires two linear encoders. However, these are duplicates. The encoders provide output pulses via electrical cables 15 and 16, respectively, to two counters 17 and 18, schematically illustrated, and which form no part of the inventive subject matter and are therefore not described or illustrated in detail.

Figure 2:
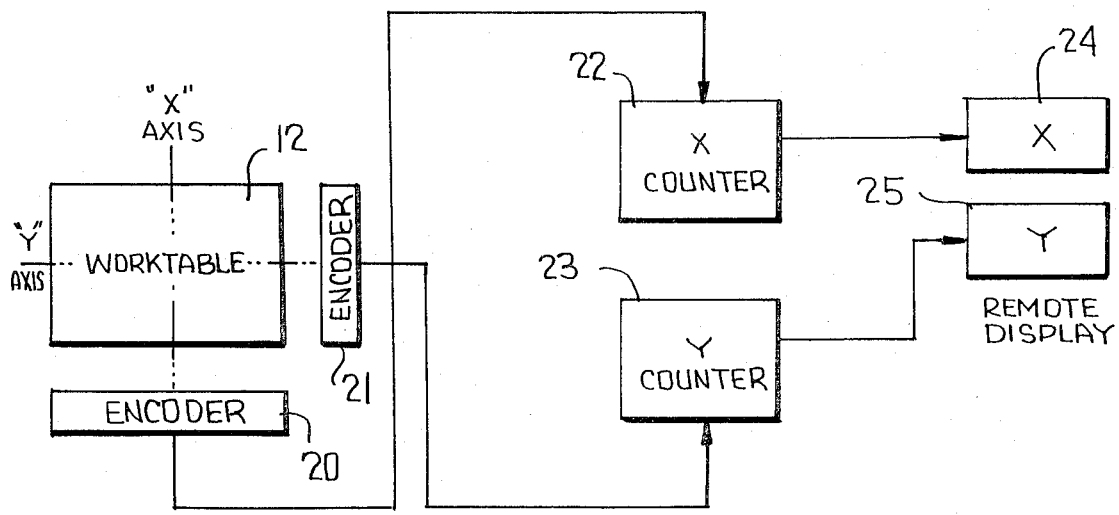
FIG. 2 is a schematized view of a conventional X – Y linear encoder system.

In FIG. 2 is schematically illustrated worktable or platen 12, movable along the X and Y axes. Encoders 20 and 21 measure movement along the X and Y axes and as the platen 12 moves the encoders translate the motion into discrete pulses, say at the rate of one pulse per mil or per half mil, for example, and the pulses are counted by counters 22 and 23. These counters may be capable of counting forwardly and backwardly with respect to a preset zero value, so that as platen 12 is moved its final position is always indicated by the counters 17, 18, in both axes. Usually a machine tool can be caused to feed automatically. The counters 22 and 23 may be arranged to provide signals, when preset counts are attained, as is conventional in such counters, and the counters may be connected to remote visual displays 24, 25.

The entire content of FIGS. 1 and 2 is conventional and is provided to show the prior art background.

Figure 3:
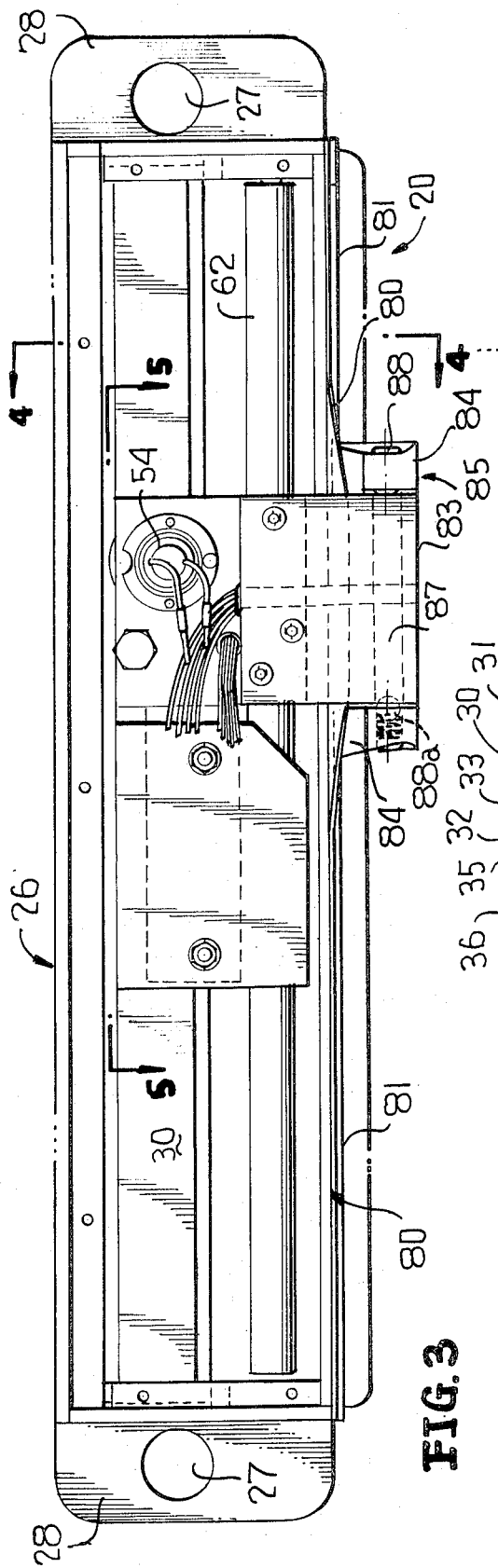
FIG. 3 is a front view of one encoder of FIG. 1 according to the invention with front cover removed.
Figure 4:
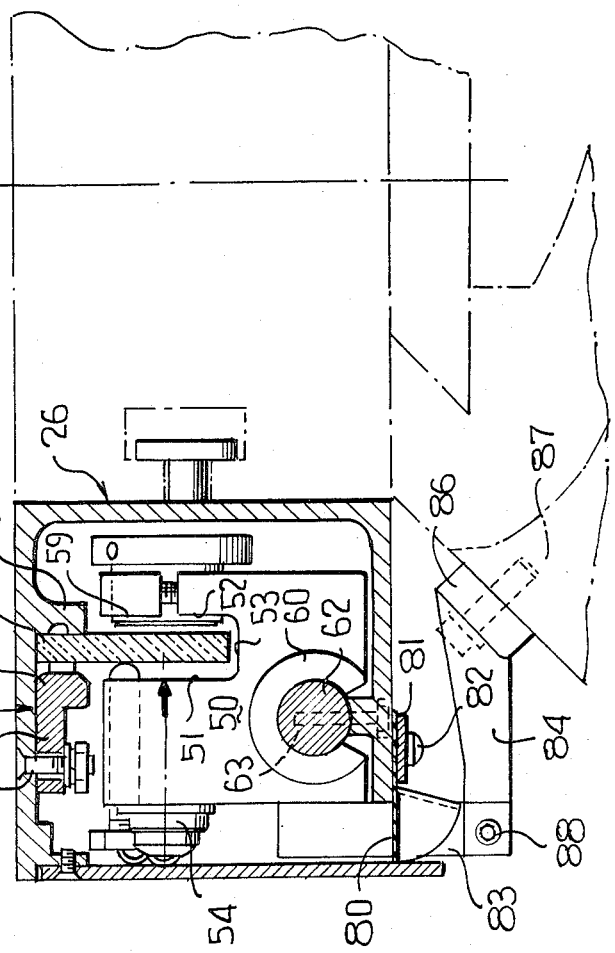
FIG. 4 is a sectional view taken on line 4 — 4 of FIG. 3.

Referring now to FIG. 3 of the accompanying drawngs, which represents a transverse cross section viewed on line 3 — 3 of FIG. 4, the encoder 20 is enclosed in a metallic casing 26 having top, bottom and two side walls, and which is light impervious. The casing 26 is secured to a movable platen, as 12 of FIG. 1, by two bolts passing through openings 27 (FIG. 4) and formed in ears 8 extending in either direction from the casing 26.

Within the casing subsists a scale 30, made of transparent material and extending essentially along the length of casing 26, and rigidly secured thereto. As the casing 26 moves, say longitudinally, with platen 12, the scale 30 moves therewith, longitudinally, and in effect is rigidly secured to platen 12 via casing 26. The scale 30 has engraved along its face vertical lines, separated by the desired unit of measurement, and as the scale moves the lines passing a fixed point are counted by an optical system which remains linearly fixed but is subject to tilt on an axis parallel to the direction of motion of the platen.

The scale 30 is secured to the casing 26 by hanging it from its upper area. One side of scale 30 is pressed against a machined downwardly extending member 31, which provides a flat surface or surfaces against which the scale 30, itself assumed flat, can position itself. The scale 30 is held in place by a positionable L-shaped clamping member 32, having one arm 33, which presses against scale 30 via a resilient gasket or spacer 34. The other arm 35 of member 32 is clamped to the top wall of enclosure 26 by means of a bolt and nut 36 which extends through a slot in arm 35 sufficiently large to enable positioning of member 32 to clamp the side 30 against downwardly extending member 31, before the bolt is tightened.

If now the scale 30 were positioned precisely parallel to the path of motion of platen 12 and were perfectly flat and hung perfectly vertically, readout of the scale would be simple. But this is not the case. The lines on the scale are read out by means of a focused beam of light located on one side of the scale 30, which projects a fine line of light through the scale onto photo-cells located on the other side of the scale via a grating mask over the photo-cells. It is essential that the distances between the sides of the scale and the photo-cells and light source be maintained invariable. In FIG. 3, 40 are photo-cells and arrow 41 shows schematically the beam of light. The markings on the scale wall must be positioned near the photo-cells, and all distances on the optical system must be and remain precise, as the scale moves with respect to the optical system, called a reader, for all longitudinal locations of the scale.

Figure 7:
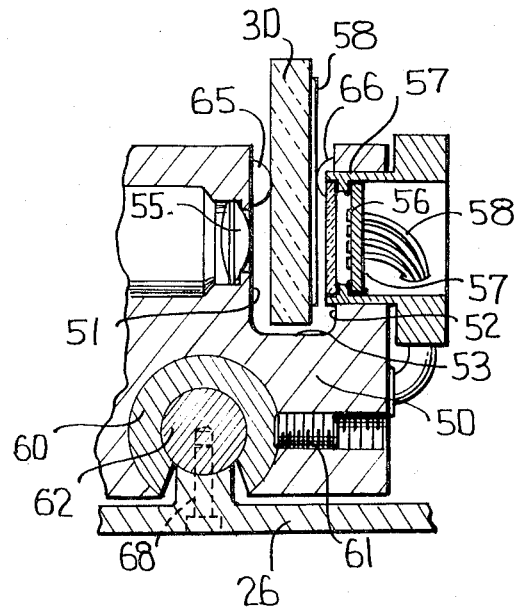
FIG. 7 is a sectional view taken on line 7 — 7 of FIG. 6.

The reader is identified as 50 in FIG. 3, and includes two arms 51, 52 joined by a base 53, forming a U-shaped receptacle for scale 30, which extends nearly to the base 53, and parallel to the arms 51, 52. Arm 51 supports a light source 54 and a condensing lens system 55 (see FIG. 7.) The photo-cell system, as seen in FIG. 7, comprises four cells 56, secured to support 57, and from which extend output leads 58. The use of four cells is not required in a simple system such as is described herein, but may be needed for certain highly sophisticated counting systems. Cells 56 are covered by a grating mask, i.e., a grating on a transparent protective plate 57a, and the vertically extending lines 58 of scale 30 are immediately adjacent to protective plate 57a.

The reader 50 includes a bearing 60, rigidly secured to reader 50 by means of a set screw 61, so that it is irrotational with respect to the reader. The bearing 60 rides on a shaft 62, which extends along the length of enclosure 26 and is secured to one wall of the enclosure 26 by bolts 63 which extend through the bottom wall of enclosure 26 and into a threaded receptacle in shaft 62. The shaft is therefore rigidly secured to enclosure 26 but bearing 60 is free to translate along the shaft and to rotate about the shaft. The reader is therefore free, as the scale 30 and shaft 62 and as enclosure 26 move together longitudinally, to maintain its position longitudinally, yet is free to rotate about the shaft 62 to conform its position transversely of the scale 30, whereby to maintain all critical optical spacings fixed.

As seen in FIG. 7, two friction-free projections, 65 and 66, extend in opposite senses from the reader 50 to the scale 30, and the scale rides between these projections, always in contact with both. The locations, perpendicularly of the faces of scale 30, of projections 65 and 66 can be adjusted so that both projections ride lightly on the scale, introducing little friction. Projections 65 and 66 are to this end made of nylon or Teflon, well known to provide virtually friction free bearing surfaces. The locations of projections 65 and 66 are so selected that all required optical spacings are correct, i.e., lines 58 to photo-cells 56 and photo-cells 56 to the marked side of scale 30, for any given adjustment of the lens, and thereafter, assuming that scale 30 is of uniform thickness throughout, the required dimensional relations will be maintained even if the orientations of scale 30 relative to the platen or worktable 12 are not precise. That orientation cannot be expected to be precise since the casing 26 is merely bolted to its associated platen at two widely separated locations of the platen, and those locations may physically represent roughly machined or cast surfaces.

Figure 5:
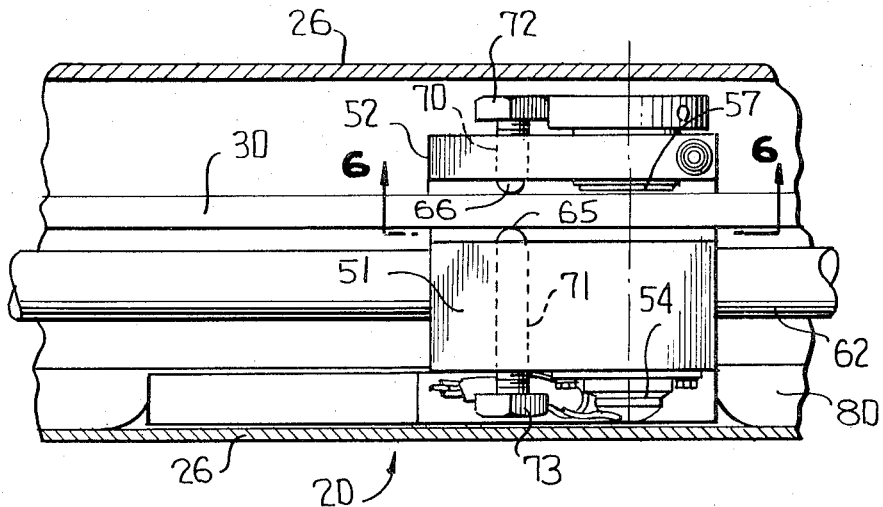
FIG. 5 is a sectional view taken on line 5 — 5 of FIG. 3.
Figure 6:
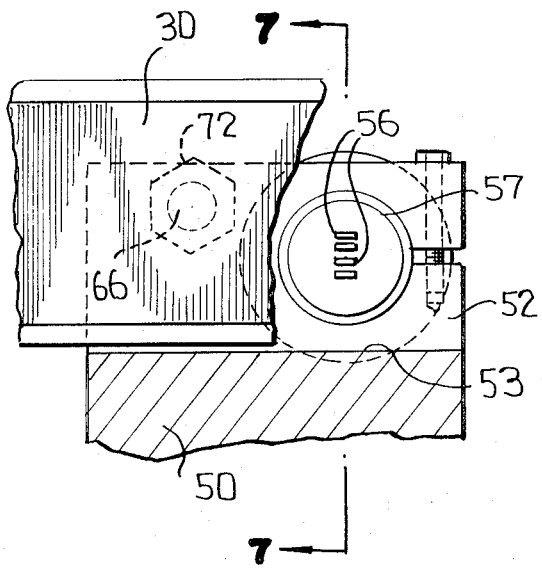
FIG. 6 is a sectional view taken on line 6 — 6 of FIG. 5.

In FIG. 5 are illustrated the projections 65 and 66 which ride on scale 30, and these are illustrated as constituting the ends of two bolts 70 and 71, having heads 72 and 73.

To the underwall of casing 26 is secured a rubber-like flap 80, secured to the casing by metallic strip 81 and bolts 82. Secured to the reader 50 and extending down through the flap 80 are arms 83 to which is pivotally secured, at pivot 84, a horizontal arm 85, which is in turn secured by bolt 85 to a stationary part of machine tool 11. As the casing 26 moves longitudinally with its associated platen 12, the reader 50 is maintained longitudinally stationary. The arm 83 projects longitudinally past the rubber flap 80, which deflects at any location along its length, as required to enable exit of arm 83, while maintaining the interior of casing 26 free of foreign material and extraneous light which, if it reached the photo-cells 56, would constitute noise. The marked or lined portions of the scale 30 are in any event located internally of the U-shaped well constituted of arms 51, 52.

The outwardly extending arm 83 extends between the arms 84 of a bracket 85 which is secured immovably by bolts 86 to a stationary element 87 of the machine tool (at least stationary relative to the axis being scanned.) The arms 84 support, one a rounded point set screw 88, and the other a spring loaded ball point rod 88a, these having rounded ends bearing on opposite sides of a pin 89 extending through arm 63, so that the rounded ends of the set screw and ball point rod enforce precise rigidity of the reader taken in the direction of the motion of the platen 12, but permit transverse motion or rotation of the arm 83, so that the reader may tilt to enable its position to conform always to the position of the scale 30, to compensate for misalignment of the shaft 62 and the line of motion of the platen 12.

Normally the inaccuracy caused by tilt to be compensated for may be about 0.005 inch and the accommodation for misalignment may amount to 0.030 inch.

The scale 30, while fabricated of glass, has an opaque coating on that one of its sides which is adjacent photocells 56 on which transparent vertical apertures are etched. The glass plate 57 is coated with emulsion on that side adjacent the scale 30, in which is etched a grating, so that light is permitted to fall on photo-cells 56 only when apertures on both palate 30 and plate 57 are aligned with the light beam provided by the optical system.

While the invention has been illustrated in simplified form as involving one lens and one set of photo-cells, in commercial forms several of these may be utilized simultaneously. The scale 30 may include plural rows of vertical lines, say to represent English or metric measurements, respectively, or for other reasons. Various forms of optical readouts and scales are known, not only in the art of linear encoders, but also in the field of shaft position encoders and these may assume various degrees of sophistication. The present invention does not concern itself with these variations and sophistications nor with the various known modes of counting fringes or lines, but rather with certain mechanical features as defined more particularly in the claims.

The principles of the invention may be practiced by making the scale stationary and the reader movable, instead of vice versa, the important feature being that there is relative motion.

What is claimed is:

1. An attachment for measuring distance travelled by a translatable object with respect to a stationary reference object, comprising a scale, said scale including a planar plate having digital markings thereon, the plane of said plate being subject to random inaccuracies of orientation, a readout for scanning said scale and counting said markings, said readout including a source of a beam of light located on one side of said scale and a photocell located on the other side of said scale in the path of said beam of light, said readout including substantially frictionless elements rigidly secured to said readout and engaging both sides of said scale simultaneously, and means pivotally mounting said readout to enable said readout to precisely follow the plane of said scale in response to movements of said substantially frictionless elements despite said inaccuracies of orientation.

2. A photoelectric encoder assembly comprising:
   a. a housing,
   b. a planar scale element positioned in said housing, said scale element including transparent spaced markings,
   c. a reader of said scale, said reader including at least one directed light beam source and at least one photosensitive element, said light beam source being positioned on one side of said scale element and directing a beam of light toward said markings, said photosensitive element being positioned on the opposite side of said scale element for detecting transmissions of said light by said markings, and
   d. means for maintaining a predetermined spacing between said scale element and said photosensitive element for all relative positions of said scale element and reader, said last means including a plurality of low friction bearing surfaces fixed on said reader and in slidable contact with both sides simultaneously of said scale element for all relative positions of said scale element and reader and means mounting said reader rotatably with respect to an axis extending parallel to the plane of said scale element, said last means also allowing limited movement of the said photosensitive element at right angles to the plane of said scale.

3. A photoelectric encoder assembly as defined in claim 2, wherein said low friction bearing surfaces are adjustably positioned in said reader for movement transversely of the plane of said scale element.

4. A photoelectric encoder assembly as defined in claim 3, wherein said low friction bearing surfaces include threaded screw elements engageable with threaded holes in said reader.

5. A photoelectric encoder assembly as defined in claim 4, wherein said reader has a U-shaped portion including a pair of legs and a bight portion, each of said screw elements being positioned in one of said legs, said scale element extending between said legs and the plane of said scale element extending parallel to said legs.

6. A photoelectric encoder assembly as defined in claim 2, including a rod positioned in said housing and extending parallel to the plane of said scale element, and means including a ball bushing secured immovably to said reader, said rod extending slidably through said ball bushing and said ball bushing being rotatable on said rod.

7. The combination according to claim 2, wherein said last means includes a bracket having on one of its arms a rounded point set screw and on the other of its arms and in opposition to said rounded point set screw a spring loaded ball point rod, a pin located between said arms, said rounded point and said ball point contacting the ends of said rod so as to enable limited relative movement of the photosensitive element and scale element in a sense perpendicular of the scale element.

8. A digital system for measuring the distance travelled by a linearly translatable object with respect to a stationary object, comprising a planar scale consisting of a transparent linearly extensive plate having uniform thickness along its length and having equally spaced markings along its length, means rigidly securing said scale to said movable object for longitudinal motion therewith, the plane of said plate being only approximately parallel to the translatory path of said translatable object, and a line perpendicular to the plane of said plate having a possible range of angular relations to said translatable object, a readout for scanning said scale and developing pulses in response to movement of said scale and its markings relative to said readout markings, means securing said readout for translation with said stationary object, said readout including a source of a beam of light directed toward said markings from one side of said scale and a photo-cell responsive to said beam of light located on the other side of said scale, and means for maintaining the relative spacings of said source, said scale and said photo-cell during motion of said scale with respect to said photo-cell, said last means including substantially frictionless bearing elements fixedly secured to said readout on opposite sides of said scale and spaced to equal the thickness of said scale and slidingly engaging said scale, said last means further including a rod extending parallel to said scale and a bushing immovably secured to said readout on said rod such that said readout can rotate to conform with movements of said frictionless bearing elements transversely of said longitudinal motion.

* * * * *